United States Patent [19]
Pike et al.

[11] Patent Number: 5,855,384
[45] Date of Patent: Jan. 5, 1999

[54] DETACHABLE AND ROTATABLE STROLLER TRAY ACCESSORY

[75] Inventors: Robert Tor Pike; Christine Elena Julien, both of Reading, Pa.

[73] Assignee: Graco Children's Products Inc., Elverson, Pa.

[21] Appl. No.: 738,233

[22] Filed: Oct. 25, 1996

[51] Int. Cl.⁶ .................................................. B62B 9/12
[52] U.S. Cl. ........................... 270/47.38; 280/47.4
[58] Field of Search ........................ 280/47.38, 47.4, 280/644, 650, 658; 297/155, 153, 5; D12/133; 108/44, 42, 143

[56] References Cited

U.S. PATENT DOCUMENTS

| | | | |
|---|---|---|---|
| D. 131,679 | 3/1942 | Greenbaum . | |
| D. 152,383 | 1/1949 | Waaranan | D15/8 |
| D. 305,522 | 1/1990 | Kohus et al. | D12/133 |
| D. 344,189 | 2/1994 | Golenz et al. | D6/339 |
| 1,178,894 | 4/1916 | Wilcox . | |
| 1,428,916 | 9/1922 | Snideman . | |
| 2,019,005 | 10/1935 | Erickson | 155/141 |
| 2,131,722 | 10/1938 | Arthur | 155/127 |
| 3,383,134 | 5/1968 | Webb et al. | 297/153 |
| 3,475,052 | 10/1969 | Kaposi | 297/153 |
| 3,516,709 | 6/1970 | Nader | 297/153 |
| 4,105,247 | 8/1978 | Saint | 297/149 |
| 4,512,607 | 4/1985 | Rapp | 297/153 |
| 4,650,246 | 3/1987 | Henriksson | 297/250 |
| 4,807,928 | 2/1989 | Cone | 297/153 |
| 4,818,016 | 4/1989 | Mariol et al. | 297/174 |
| 4,819,988 | 4/1989 | Hellstrom | 297/467 |
| 4,842,331 | 6/1989 | Waples | 297/149 |
| 4,844,537 | 7/1989 | Reed | 297/174 |
| 4,856,809 | 8/1989 | Kohus et al. | 280/644 |
| 4,946,180 | 8/1990 | Baer | 280/39 |
| 4,968,092 | 11/1990 | Giambrone | 297/151 |
| 5,106,156 | 4/1992 | Marquis | 297/153 |
| 5,118,161 | 6/1992 | Slowe et al. | 297/153 |
| 5,131,715 | 7/1992 | Balles | 297/5 |
| 5,165,755 | 11/1992 | Rho | 297/345 |
| 5,183,311 | 2/1993 | Meeker et al. | 297/151 |
| 5,238,292 | 8/1993 | Golenz et al. | 297/153 |
| 5,334,099 | 8/1994 | Marra et al. | 472/118 |
| 5,364,137 | 11/1994 | Shimer | 297/327 |
| 5,375,869 | 12/1994 | Hsiao | 280/648 |
| 5,382,074 | 1/1995 | Pietra | 297/153 |
| 5,458,394 | 10/1995 | Nichols et al. | 297/173 |
| 5,468,043 | 11/1995 | Chien | 297/153 |
| 5,489,138 | 2/1996 | Mariol et al. | 297/151 |
| 5,507,550 | 4/1996 | Maloney | 297/153 |
| 5,509,719 | 4/1996 | Cone, II | 297/344.14 |
| 5,527,090 | 6/1996 | Cone, II | 297/149 |
| 5,527,096 | 6/1996 | Shimer | 297/327 |
| 5,785,290 | 7/1998 | Harris | 248/311.2 |

OTHER PUBLICATIONS

Best Catalog, 1994/1995, p. 477.

*Primary Examiner*—Brian L. Johnson
*Assistant Examiner*—Bridget Avery
*Attorney, Agent, or Firm*—Richard B. O'Planick

[57] ABSTRACT

A tray accessory for use with a stroller. Preferably, the tray accessory provides a tray portion, a pair of support members connected to the tray portion and a pair of connection portions. Each connection portion being attached to a respective support member. The connection portions are configured to rotatably and detachably connect the tray portion to the stroller.

20 Claims, 3 Drawing Sheets

DETACHABLE AND ROTATABLE STROLLER TRAY ACCESSORY

BACKGROUND OF THE INVENTION

1. Field of the Invention

The present invention relates to a tray accessory, and more particularly, to a detachable and rotatable stroller tray accessory.

2. Description of the Related Art

Strollers have been very popular in the children's product market. Although highly popular, conventional strollers have certain shortcomings. For example, oftentimes, parents wish to feed a child or to provide the child with a toy with which to play while the child is in the stroller. Many conventional strollers have no surface to aid these endeavors or have surfaces that are ineffective or inconvenient.

SUMMARY OF THE INVENTION

Accordingly, the present invention is directed to a detachable and rotatable stroller tray accessory that substantially obviates one or more of the problems due to limitations and disadvantages of the related art.

An object of the present invention is to provide a conventional stroller with a detachable and rotatable tray accessory to provide a surface for feeding or play.

Another object of the present invention is provide a detachable and rotatable tray accessory which can be easily attached to and detached from a conventional stroller without requiring modification to the stroller.

A further object of the present invention is to facilitate the removal of food or drink spillage from the surface of such a tray accessory.

Additional features and advantages of the invention will be set forth in part in the description which follows, and in part will be apparent from the description, or may be learned by practice of the invention. The objects and other advantages of the invention will be realized and attained by the structure particularly pointed out in the written description and claims hereof as well as the appended drawings.

To achieve the objects and in accordance with the purpose of the invention, as embodied and broadly described, the tray accessory according to the invention comprises a tray portion and at least one connection portion coupled to the tray portion, the at least one connection portion being configured to rotatably and detachable connect the tray portion to the stroller.

It is to be understood that both the foregoing general description and the following detailed description are exemplary and explanatory only and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate one embodiment of the invention and together with the description serve to explain the principles of the invention. In the drawings.

DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
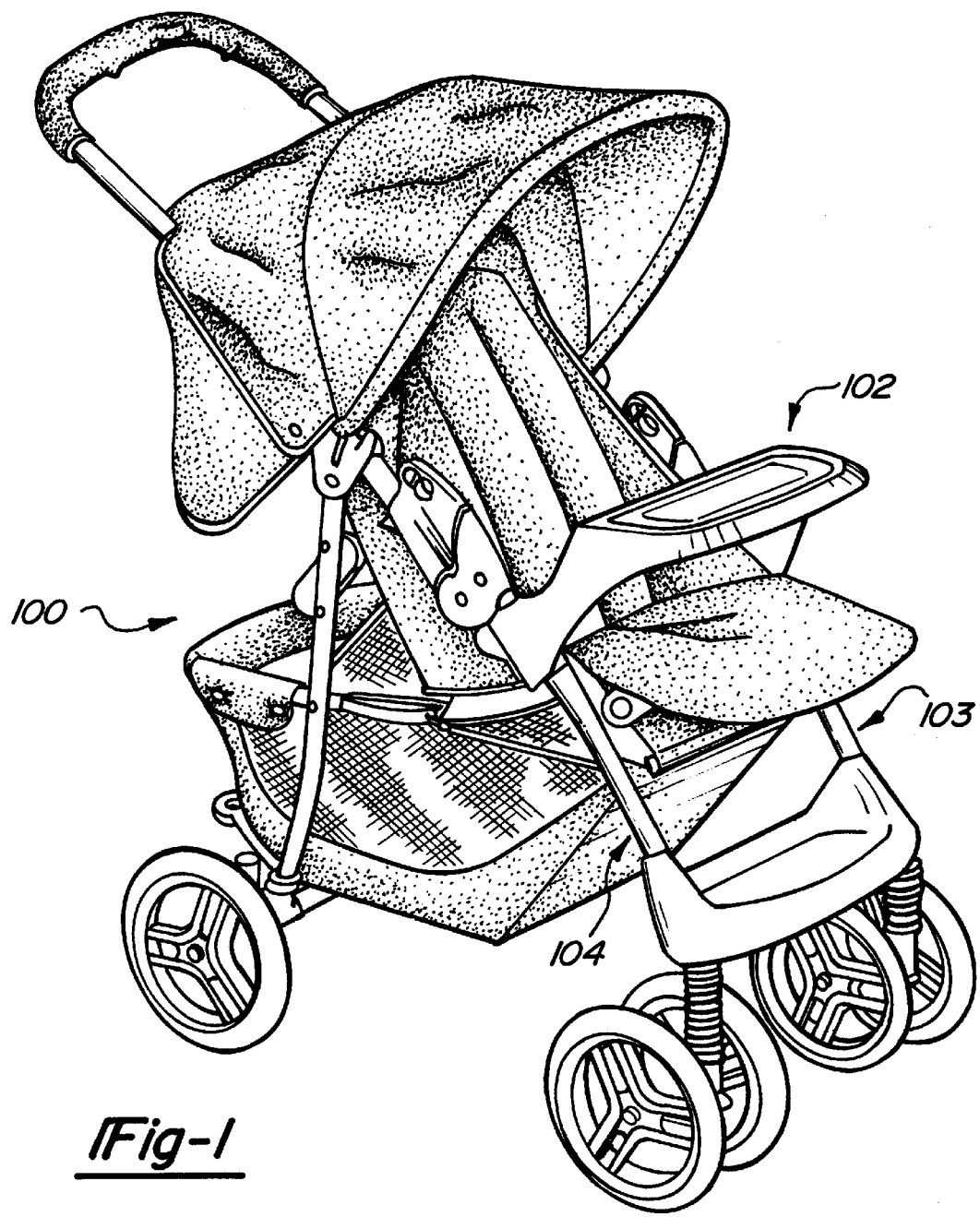
FIG. 1 is a plan view of a stroller with a tray accessory according to the present invention.

FIG. 1 illustrates a baby stroller 100 including, among other things, a pair of front wheel supports 103 and 104. FIG. 1 further illustrates a tray accessory 102 rotatably and detachably connected to the front wheel supports 103 and 104. The tray accessory 102 is made, for example, of a flexible, durable resilient material, such as a polypropylene copolymer. Preferably, the material used for the tray accessory 102 allows the tray accessory 102 to easily bend under sufficient force, e.g., the weight of a child. Thus, if, for example, a child (or adult for that matter) leans on or otherwise applies pressure to the tray accessory 102, the tray accessory 102 will bend and thus deter the child from exerting further pressure on the tray accessory 102. If the tray accessory 102 were to not bend, the child might continue to lean on the tray accessory 102 and thus tip the stroller 100 possibly injuring the occupant of the stroller 100.

Figure 2:
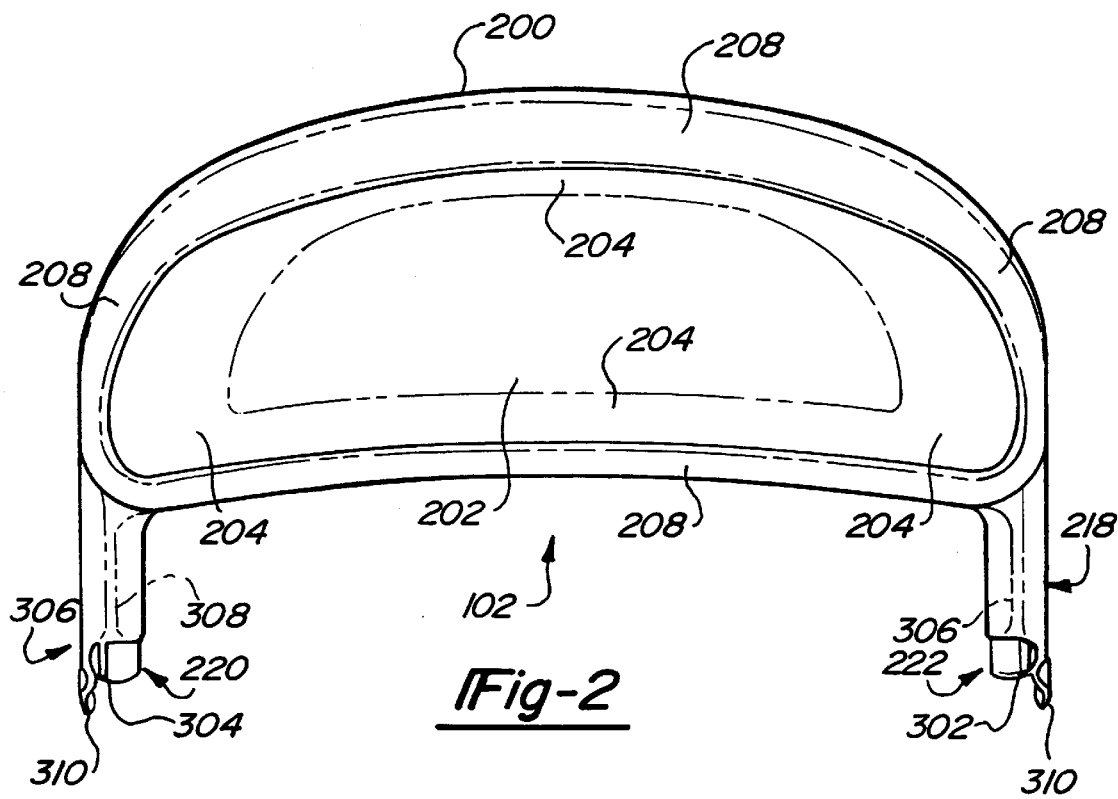
FIG. 2 is a top view of the tray accessory.

As shown in FIG. 2, the tray accessory 102 comprises a tray portion 200 including a flat central area 202. Preferably, the flat central area 202 is circumscribed by a raised rounded edge 208 for retaining food, a beverage, a child's toy, or the like. Further, an outer circumference 204 of the flat central area 202 preferably slopes upwards toward the edge 208 to facilitate the removal of food and drink spilled on the tray accessory 102.

First and second support members 216 and 218, respectively, extend from the tray portion 200 to provide spacing between the tray portion and an occupant of the stroller 100. In an alternative embodiment, the tray portion 200 can include an appropriate recess for providing such a spacing, in which case the first and second support members 216 and 218 could be omitted.

Connection portions 220 and 222 are provided at the distal ends of the first and second support members 216 and 218, respectively, or provided directly on the tray portion 200 if the first and second support members 216 and 218 are omitted as explained above. As will be described in more detail below, the connection portions 220 and 222 are configured to rotatably and detachably connect the tray accessory 102 to the front wheel supports 103 and 104 of the stroller 100.

Figure 3:
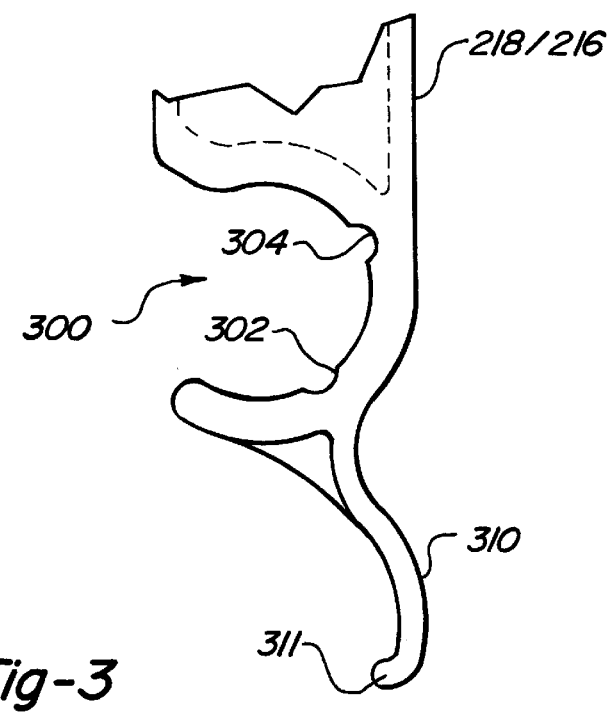
FIG. 3 is a side view of the engagement collar.

As shown in FIG. 3, in the preferred embodiment of the invention, each of the connection portions 220 and 222 (only one connection portion is shown) comprises an engagement collar 300. The engagement collars 300 are preferably shaped and sized to firmly grasp the front wheel supports 103 and 104 of the stroller 100. For example, in the particular embodiment shown, the front wheel supports 103 and 104 are tubular and the engagement collars 300 are C-shaped and sized with a diameter slightly less than that of the front wheel supports 103 and 104. It should be appreciated that other structures known in the art can be used for the connection portions 220 and 222 to practice the invention, and that the connector portions 220 and 222 could be connected to other portions of the stroller rather than the wheel supports 103 and 104.

As further shown in FIG. 3, each of the engagement collars 300 further comprises two longitudinal channels 302 and 304 formed along an inner surface thereof to provide areas at which the engagement collar 300 exhibits increased flexibility. The channels 302 and 304 also facility manufacturing, in particular the molding process, of the collars 300. It should be appreciated that this feature of the invention facilitates expansion of the collars 300 and thus detachment of the tray accessory 102 from the front wheel supports 103 and 104.

As still further shown in FIG. 3, a flange 310 extends from each of the engagement collars 300. The flanges 310 also facilitate expansion of the collars 300 and thus detachment of the tray accessory 102 from the front wheel supports 103 and 104. Specifically, detachment of the tray accessory 102 can be accomplished by simply firmly grasping the flanges 310 with the thumb and index finger and pulling the flanges 310 outward and away from of the collars 300. Preferably, the tips 311 of the flanges 310 are rounded and curve inward to prevent the flanges 310 from becoming snagged on the stroller 100 (e,g., on the stroller fabric) during operation of the flanges 310.

Figure 4:
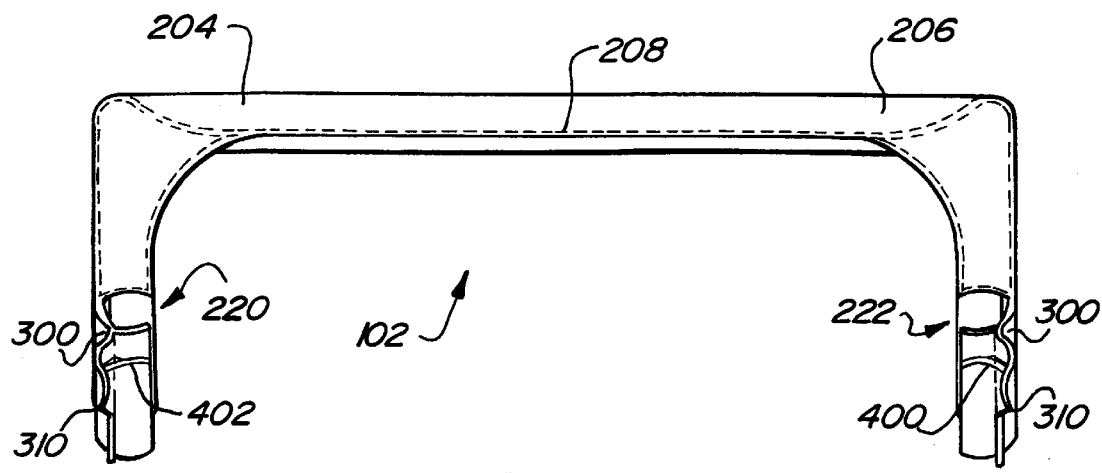
FIG. 4 is a rear view of the tray accessory.

FIG. 4 illustrates a rear view of the tray accessory 102. As shown in FIG. 4, a pair of support ribs 400 and 402 are preferably provided between the engagement collars 300 and the flanges 310. The support ribs 400 and 402 provide additional structural support for flanges 301 and facilitate the expansion of the collars 300 when the flanges 310 are pulled.

It should be appreciated that it is possible to either simultaneously or individually disengage the connection portions 220 and 222 from the front wheel supports 103 and 104. It should also be appreciated that disengagement of only one of the connection portions enables the tray accessory 102 to be rotated about the still-engaged connection portion and away from the occupant of the stroller 100. Thus, the occupant can be removed from the stroller 100 without having to completely detach the tray accessory 102 from the stroller 100.

Preferably, stopping mechanisms (not shown) are fitted on and secured to the front wheel supports 103 and 104 to provide a surface on which the connection portions 220 and 222 bear. These stopping mechanisms prevent the connection portions 220 and 222 from sliding along the front wheel supports 103 and 104 and provide a convenient means for readily positioning the tray accessory 102. Such stopping mechanisms could comprise, for example, molded plastic collars or other structures known in the art which are clamped, bolted, or otherwise adjustably secured to the front wheel supports 103 and 104. In an alternative embodiment, the stopping mechanisms are omitted such that the height of the tray accessory 102 relative to the occupant can be adjusted by simply sliding the connection portions 220 and 222 along the front wheel supports 103 and 104.

Finally, while the foregoing embodiment includes two engagement portions 220 and 222, the present invention can be practiced using only one of the engagement portions 220 and 222.

It will be apparent to those skilled in the art that various modifications and variations can be made in the stroller tray accessory of the present invention without departing from the spirit or scope of the invention. Thus, it is intended that the present invention cover the modifications and variations of this invention provided they come within the scope of the appended claims and their equivalents.

What is claimed is:

1. A tray accessory for use with a stroller having a plurality of front wheel supports, each front wheel support of said plurality having an outer surface, said tray accessory comprising:

a tray portion; and at least one connection portion coupled to the tray portion, the at least one connection portion comprising an engagement collar, said engagement collar being sized and shaped to releasably grasp said outer surface such that the engagement collar is rotatably and detachably connected to the stroller, said engagement collar further including at least one longitudinal channel such that the engagement collar exhibits increased flexibility.

2. The tray accessory as recited in claim 1, further comprising at least one support member extending from the tray portion and coupling the connection portion to the tray portion.

3. The tray accessory as recited in claim 1, wherein the tray portion includes a flat central area circumscribed by a raised edge.

4. The tray accessory as recited in claim 3, wherein an outer circumference of the flat central area is sloped upward towards the raised edge.

5. The tray accessory as recited in claim 1, wherein the engagement collar is C-shaped.

6. The tray accessory as recited in claim 1, further comprising a flange extending from the engagement collar, the flange being operable to facilitate expansion of the engagement collar.

7. A tray accessory for use with a stroller having a plurality of front wheel supports, each front wheel support of said plurality having an outer surface, said tray accessory comprising:

a tray portion; and first and second connection portions coupled to the tray portion, the first and second connection portions each comprise an engagement collar, said engagement collar being sized and shaped to releasably grasp said outer surface such that the engagement collar is rotatably and detachably connected to the stroller, said engagement collar further including at least one longitudinal channel such that the engagement collar exhibits increased flexibility.

8. The tray accessory as recited in claim 7, further comprising first and second support members extending from the tray portion and coupling the first and second connection portions to the tray portion.

9. The tray accessory as recited in claim 7, wherein the tray portion includes a flat central area circumscribed by a raised edge.

10. The tray accessory as recited in claim 9, wherein an outer circumference of the flat central area is sloped upward towards the raised edge.

11. The tray accessory as recited in claim 7, wherein each of the engagement collars is C-shaped.

12. The tray accessory as recited in claim 7, further comprising first and second flanges extending from the first and second engagement collars, the first and second flanges being operable to facilitate expansion of the first and second engagement collars.

13. The tray accessory as recited in claim 7, wherein the first and second connection portions can be simultaneously or individually disengaged from the stroller.

14. The tray accessory as recited in claim 13, wherein disengagement of only one of the first and second connection portions from the stroller enables rotation of the tray portion about the other of the first and second connection portions.

15. A stroller comprising:

a plurality of front wheel supports, each front wheel support of said plurality having an outer surface; and a tray accessory, the tray accessory including a tray portion and at least one connection portion coupled to the tray portion, the at least one connection portion comprising an engagement collar, said engagement collar being sized and shaped to releasably grasp said outer surface such that the engagement collar is rotatably and detachably connected to the stroller, said engagement collar further including at least one longitudinal channel such that the engagement collar exhibits increased flexibility.

16. A stroller comprising:

a plurality of front wheel supports comprising a first front wheel support and a second front wheel support, each front wheel support of said plurality having an outer surface;

a tray accessory, the tray accessory comprising a tray portion, a first connection portion attached to the tray portion and a second connection portion attached to the tray portion, a first engagement collar attached to a first connection portion and a second engagement collar attached to the second connection portion, each said engagement collar having a diameter approximately less than the diameter of the respective first wheel support and the second front wheel support, each engagement collar further having a C-shape such that the first engagement collar and the second engagement collar releasably grasp said outer surface, each engagement collar having at least one longitudinal channel such that the engagement collar is deformable; and a first stop disposed on the first front wheel and a second stop disposed on the second front wheel.

17. The tray accessory as recited in claim 1, wherein each engagement collar has a diameter sized approximately less than the diameter of the outer surface.

18. The stroller as recited in claim 15, wherein the stroller further comprises at least one stop on the plurality of front wheel supports.

19. The stroller as recited in claim 18, wherein the at least one stop is a first stop disposed on a first wheel support and a second stop disposed on a second wheel support.

20. The stroller as recited in claim 19, wherein the first stop and the second stop are each a molded collar frictionally engaged with the first front wheel support and the second front wheel support respectively.

* * * * *